United States Patent
Gribanova et al.

(10) Patent No.: US 12,541,902 B2
(45) Date of Patent: Feb. 3, 2026

(54) SIGN LANGUAGE GENERATION AND DISPLAY

(71) Applicant: Cisco Technology, Inc., San Jose, CA (US)

(72) Inventors: Elena Gribanova, Dublin, CA (US); Valentin Filippov, Maple (CA); Pedro Jesus Garcia Chavez, Mexico City (MX); Wei Yan, Oakland, CA (US); David C. White, Jr., St. Petersburg, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 230 days.

(21) Appl. No.: 18/315,721

(22) Filed: May 11, 2023

(65) Prior Publication Data
US 2024/0378782 A1    Nov. 14, 2024

(51) Int. Cl.
*G06T 13/00* (2011.01)
*G06T 7/70* (2017.01)
(Continued)

(52) U.S. Cl.
CPC ............... *G06T 13/00* (2013.01); *G06T 7/70* (2017.01); *G06T 11/60* (2013.01); *G06V 20/41* (2022.01);
(Continued)

(58) Field of Classification Search
CPC .................................. G06T 13/00; G06T 7/70
See application file for complete search history.

(56) References Cited

U.S. PATENT DOCUMENTS

| | | | |
|---|---|---|---|
| 10,777,202 B2 * | 9/2020 | Mindlin | H04S 7/40 |
| 2006/0046699 A1 * | 3/2006 | Guyot | H04L 69/329 |
| | | | 455/414.1 |

(Continued)

FOREIGN PATENT DOCUMENTS

KR    20210085938 A    7/2021

OTHER PUBLICATIONS

Patel, B., et al., "ES2ISL: An Advancement in Speech to Sign Language Translation using 3D Avatar Animator," 2020 IEEE Canadian Conference on Electrical and Computer Engineering (CCECE), https://www.researchgate.net/publication/340172581_ES2ISL_An_Advancement_in_Speech_to_Sign_Language_Translation_using_3D_Avatar_Animator, Nov. 2020, 5 pages.

(Continued)

*Primary Examiner* — Yi Yang
(74) *Attorney, Agent, or Firm* — Edell, Shapiro & Finnan, LLC

(57) ABSTRACT

A method includes receiving, via one or more processors, video data and audio data associated with respective participants in a video session, determining, via the one or more processors, words spoken by a speaker participant in the video session based on the audio data, determining, via the one or more processors, a location of the speaker participant in a framing of the video data based on the video data and the audio data, generating, via the one or more processors, an animated avatar to provide sign language representing the words spoken by the speaker participant, modifying, via the one or more processors, the video data of the video session to include the animated avatar based on the location of the speaker participant, and outputting, via the one or more processors, the video data that includes the animated avatar.

20 Claims, 11 Drawing Sheets

(51) Int. Cl.
  *G06T 11/60* (2006.01)
  *G06V 20/40* (2022.01)
  *G06V 40/10* (2022.01)
  *G10L 17/22* (2013.01)
  *G10L 25/57* (2013.01)
(52) U.S. Cl.
  CPC .............. *G06V 40/10* (2022.01); *G10L 17/22* (2013.01); *G10L 25/57* (2013.01); *G06T 2207/10016* (2013.01); *G06T 2207/30196* (2013.01)

(56) References Cited

U.S. PATENT DOCUMENTS

| | | | |
|---|---|---|---|
| 2015/0120851 A1* | 4/2015 | Kimura | H04L 51/52 |
| | | | 709/206 |
| 2020/0036546 A1 | 1/2020 | Soni et al. | |
| 2020/0234481 A1* | 7/2020 | Scapel | A63F 13/213 |
| 2020/0294525 A1 | 9/2020 | Santos et al. | |
| 2022/0028153 A1* | 1/2022 | Choi | G06T 15/20 |
| 2022/0343576 A1 | 10/2022 | Marey et al. | |
| 2023/0032545 A1* | 2/2023 | Mindlin | H04L 65/765 |
| 2025/0205599 A1* | 6/2025 | Annaswamy | A63F 13/428 |

OTHER PUBLICATIONS

Chakladar, D., et al., "3D Avatar Approach for Continuous Sign Movement Using Speech/Text," Article, Applied Sciences, MDPI, https://www.mdpi.com/2076-3417/11/8/3439, Apr. 2021, 13 pages.

* cited by examiner

SIGN LANGUAGE GENERATION AND DISPLAY

TECHNICAL FIELD

The present disclosure relates to video presentations.

BACKGROUND

Video content typically contains visual output and corresponding audio output (e.g., spoken words). However, certain individuals may not be able, or may have reduced ability, to perceive audio output being provided. Thus, alternative features may be provided to enable such individuals to understand the video content without having to utilize audio output. Unfortunately, it may be difficult to present such alternative features in a manner that enables the individuals to comprehend information easily, such as to discern between words spoken by different speakers and/or to maintain attention to the visual output simultaneously being provided.

DETAILED DESCRIPTION

Overview

Figure 1:
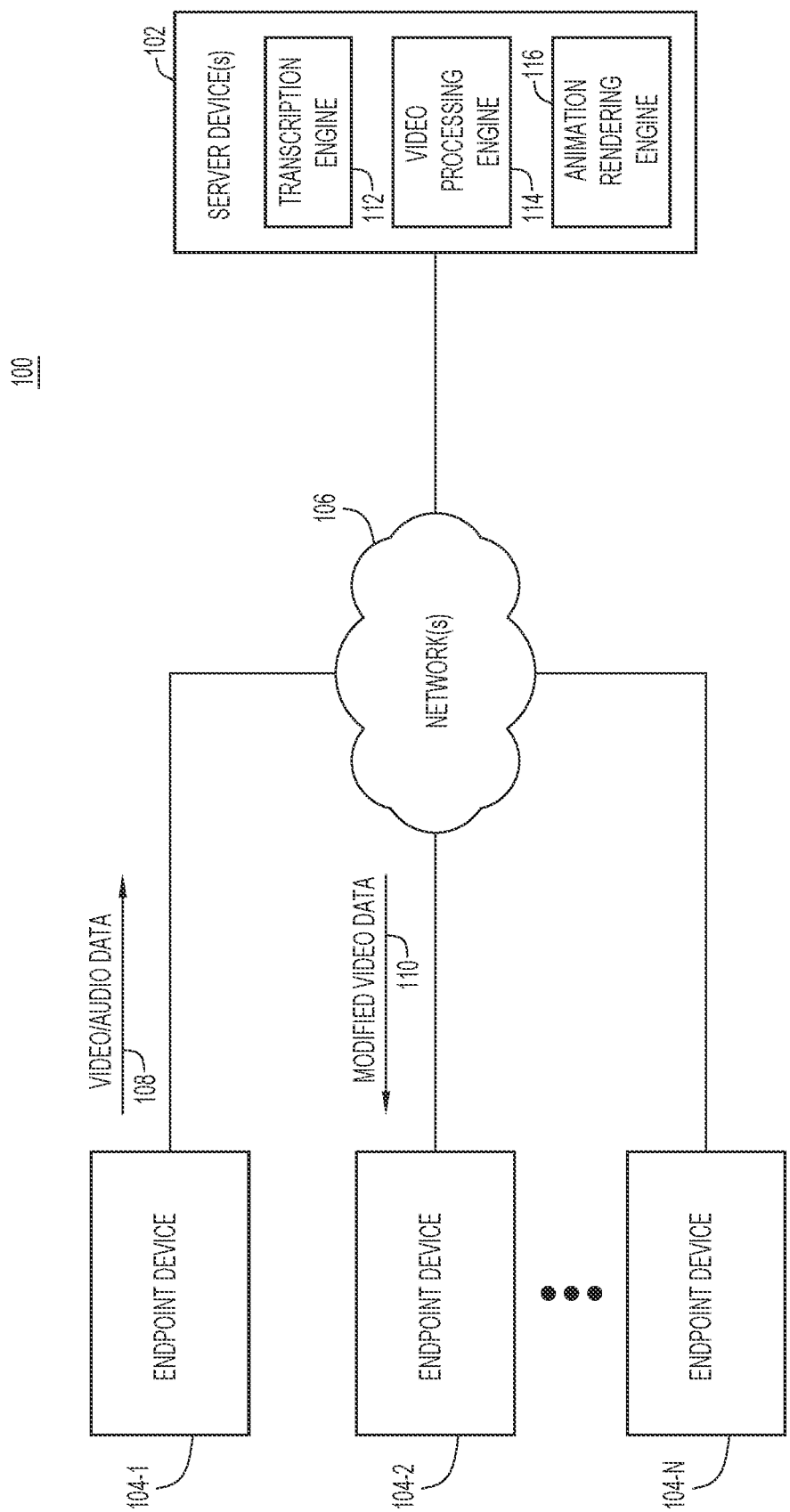
FIG. 1 is a block diagram of a video presentation system configured to provide sign language content, according to an example embodiment.

In one embodiment, a method includes receiving, via one or more processors, video data and audio data associated with respective participants in a video session; determining, via the one or more processors, words spoken by a speaker participant in the video session based on the audio data; determining, via the one or more processors, a location of the speaker participant in a framing of the video data based on the video data and the audio data; generating, via the one or more processors, an animated avatar to provide sign language representing the words spoken by the speaker participant; modifying, via the one or more processors, the video data of the video session to include the animated avatar based on the location of the speaker participant; and outputting, via the one or more processors, the video data that includes the animated avatar.

Example Embodiments

Videos are used to provide content in different settings. For example, videos (e.g., live/real-time videos, videotelephony, pre-recorded videos) may be used during a meeting or webinar, as a form of media, for communicating visual information, such as to enable people to view and interact with one another in real-time. Often, videos are paired with audio content. That is, video data (e.g., visual content) and audio data may be concurrently presented. For instance, audio data may include words spoken by individuals or other noise provided by entities shown in the video data. Thus, the audio data may provide information that is not otherwise provided by the video data and help complete understanding of a video.

However, an individual may have a reduced ability to intake the audio data or may otherwise be unable to utilize the audio data provided with video data. As an example, the individual may only be readily able to intake visual content. But, without audio data, the individual may not be able to receive comprehensive information being provided by a video. That is, certain information that is being provided via the audio data, rather than the video data, may not be received by the individual. For example, an individual may be hearing-impaired.

For this reason, other features may be used to present the information provided via audio data and enable the individual to receive complete information from a video (e.g., a live video) without having to intake audio data. Embodiments described herein provide sign language content to present such information. Sign language may be more efficiently observed by the individual as compared to, for example, captions and subtitles. To provide sign language content, words spoken by a speaker participant may be determined. Sign language gestures corresponding to the words are then determined, and an avatar is generated and animated to provide the sign language gestures. Video data is modified (e.g., dynamically modified) to include the animated avatar for presentation of sign language. In this way, insertion of the animated avatar in the video data for display is triggered by the voice of the speaker participant during speech. In some embodiments, a framing of the video data is modified to overlay the animated avatar thereon and render the animated avatar adjacent to the speaker participant in the framing. Thus, a user viewing the video data may more readily associate the animated avatar with the speaker participant (e.g., and not with other participants). Additionally, the user may be able to simultaneously view the speaker participant and the animated avatar to be able to intake information more readily (e.g., to observe a gesture, facial expression, mood, or other information provided by the speaker participant while observing the sign language content provided by the animated avatar), because both the speaker participant and the animated avatar are (co-located) within sight range of the user.

In some embodiments, an appearance of the avatar may be generated based on an appearance of the speaker participant. For example, the appearance of the speaker participant, such as a gender, a hair color/style, a facial feature, an article of clothing, a color of clothing, and/or an accessory, may be determined based on received video data, and the appearance of the avatar may correspond to the appearance of the speaker participant. The received video data may then be modified to include the avatar. In this manner, the same video data may be used to generate the appearance of the avatar and modified to include the avatar. As such, the appearance of the avatar may be dynamically adjusted and updated based on the appearance of the speaker participant in the received video data. Thus, the avatar may continue to resemble the appearance of the speaker participant to enable the user to accurately associate the avatar with the speaker participant.

Additionally, in certain embodiments, display of the avatar may be suspended or removed in response to determining a participant is no longer speaking. In other words, an avatar of a participant is blocked or removed from presentation when the voice of the participant is not detected. Thus, unnecessary diversion of the user's attention to inactive avatars may be avoided to enable the user to focus on information being provided by actively speaking participant(s). Moreover, avatars may be rendered on video data to avoid overlapping with other avatars and/or other participants. As such, obstruction of other content contained in the video data may be avoided. Therefore, the video data may provide sign language content that is easily observable by the user without affecting other information being provided by the video data. Indeed, by using avatars presenting sign language, the user may efficiently intake the information provided by the avatars and be able to observe other information being provided by the video data, thereby improving the user experience and/or understanding with respect to the video data. As a result, user participation and engagement, such as interacting with other participants in a video session, may also increase.

With reference made to FIG. 1, FIG. 1 shows a block diagram of a video presentation system 100 that is configured to provide sign language content. The video presentation system 100 includes one or more server device(s) 102 (e.g., meeting server(s)) and a plurality of endpoint devices 104-1 to 104-N (sometimes referred to herein individually as an endpoint device 104 or collectively as endpoint devices 104) that communicate with the server device(s) 102 via one or more networks 106. Each of the endpoint devices 104-1 to 104-N may be a tablet, a laptop computer, a desktop computer, a mobile phone, a virtual desktop client, a virtual whiteboard, or any physical or virtual device or system (now known or hereinafter developed) configured to generate video and audio output and/or receive, decode, and/or display video data with avatar content (e.g., return program feed with embedded avatars). The endpoint device 104-1 to 104-N may have a display to present video data. The endpoint devices 104-1 to 104-N may also have short-range wireless system connectivity (such as Bluetooth™ wireless system capability, ultrasound communication capability, etc.) to enable local wireless connectivity with a video endpoint device in a meeting room or with other user devices in the same meeting room. The endpoint devices 104-1 to 104-N may store content (e.g., a presentation, a document, images, etc.) for sharing content, such as with other user devices during an online meeting or communication session.

In some embodiments, the endpoint devices 104-1 to 104-N may be endpoint devices for facilitating communication with the server device(s) 102 during an online meeting. The endpoint devices 104-1 to 104-N may additionally connect to user devices (not illustrated in FIG. 1) for sharing content stored on the user devices during the online meeting.

In some cases, the endpoint devices 104-1 to 104-N may be videoconference endpoints designed for personal use (e.g., a desk device used by a single user) or for use by multiple users (e.g., a videoconference endpoint in a meeting room). In some embodiments, the endpoint devices 104-1 to 104-N may be configured to open content to display or share (e.g., when a digital whiteboard is accessed directly on the endpoint device 104). By way of example, the first endpoint device 104-1 may receive (e.g., via a camera or other visual sensor) video data of a first user that is using the first endpoint device 104-1. The video data may be transmitted from the first endpoint device 104-1 to the second endpoint device 104-2, and the second endpoint device 104-2 may display the video data of the first user. A second user that is using the second endpoint device 104-2 may then see the video data of the first user via the second endpoint device 104-2.

The server device(s) 102 may be configured to provide an online meeting service for hosting a communication session among the endpoint devices 104-1 to 104-N. The server device(s) 102 may also generate sign language content and enable any of the endpoint devices 104-1 to 104-N to present the sign language content. In the example illustrated in FIG. 1, the first endpoint device 104-1 detects video/audio data 108 of a first user (e.g., a first participant), such as words spoken by the first user. The first endpoint device 104-1 transmits the video/audio data 108 to the server device(s) 102 via the network(s) 106. The server device(s) 102 may include a transcription engine 112, a video processing engine 114, and an animation rendering engine 116 that operate to generate sign language content based on the video/audio data 108. For example, the transcription engine 112 may determine words spoken by the first user based on the video/audio data 108. The video processing engine 114 may determine a location and/or an appearance of the first user based on the video/audio data 108. The animation rendering engine 116 may generate an avatar and animate the avatar to provide sign language content based on the words determined by the transcription engine 112 and the appearance of the first user determined by the video processing engine 114. The animation rendering engine 116 may then modify the video/audio data 108 to include the avatar based on the location of the first user determined by the video processing engine 114, thereby generating modified video data 110. The server device(s) 102 may then output the modified video data 110 to the second endpoint device 104-2 via the network(s) 106. The endpoint device 104-2 may display the modified video data 110 to a second user (e.g., a second participant), who can then view the avatar providing the sign language content. Because the sign language content provides information generated based on audio data, the second user may receive such information via the modified video data 110 without having to utilize the audio data or with a lesser/reduced reliance on the audio data.

In some embodiments, the server device(s) 102 may output both the modified video data 110 and unmodified video data to any of the endpoint devices 104. The endpoint device(s) 104 may then select either the modified video data 110 or the unmodified video data for presentation. For example, the endpoint device(s) 104 selects the corresponding video data (e.g., to display sign language content or avoid displaying sign language content) based on a user input and/or a stored user preference.

Although the functions of the transcription engine 112, the video processing engine 114, and the animation rendering engine 116 are performed at the server device(s) 102 in the example described with respect to FIG. 1, the functions of any of the transcription engine 112, the video processing engine 114, or the animation rendering engine 116 may be performed at an endpoint device 104-1 to 104-N or a different device not illustrated in FIG. 1. That is, any of the endpoint devices 104-1 to 104-N may perform operations to generate sign language content (e.g., with limited or no operational execution by the server device(s) 102).

Figure 2:
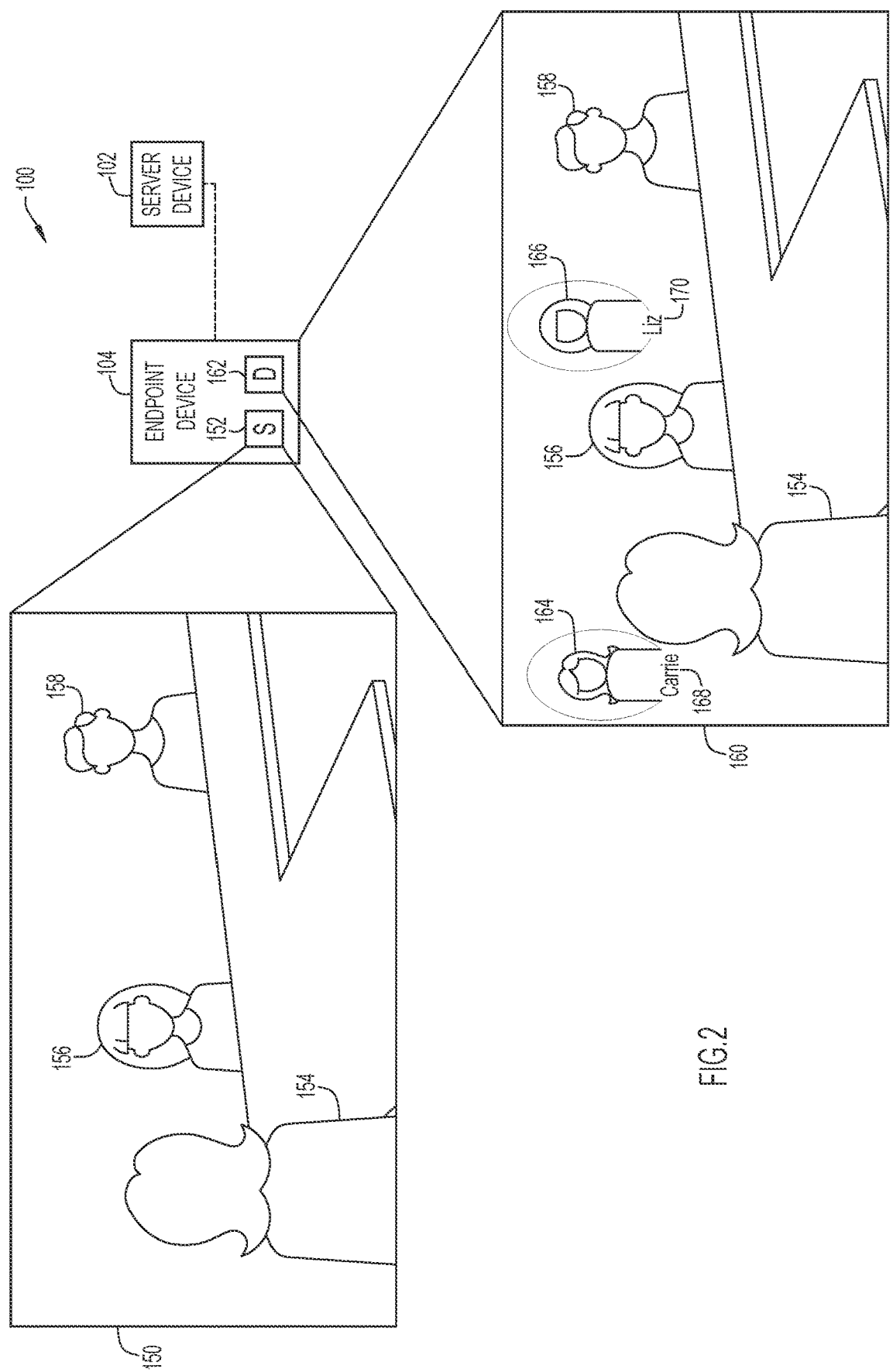
FIG. 2 is a diagram of a video presentation system configured to output video data that includes animated avatars presenting sign language content, according to an example embodiment.

FIG. 2 is a diagram of the video presentation system 100 configured to output video data that includes animated avatars presenting sign language content, according to embodiments presented herein. The endpoint device 104 (representative of a single endpoint device 104 or multiple endpoint devices 104 communicatively coupled to one another) is configured to receive first video data 150 in the illustrated embodiment. The endpoint device 104 may also be configured to receive audio data corresponding to the first video data 150. By way of example, the first video data 150 may be received during a video session for a meeting having multiple participants, and the audio data may include words spoken by a speaker participant. The endpoint device 104 includes a sensor 152 configured to receive the first video data 150 and/or the corresponding audio data. The sensor 152 may include an optical sensor (e.g., a camera) and/or an audio sensor (e.g., a microphone). The endpoint device 104 may transmit the first video data 150 to the server device 102 for further processing.

The server device 102 may determine information related to participants in the first video data 150. For instance, the first video data 150 is composed of multiple framings or still imagery that collectively form the first video data 150. The server device 102 may initially identify each participant in the framings by performing human detection, such as by recognizing human facial features. For instance, the server device 102 may identify a first participant 154, a second participant 156, and a third participant 158 associated with the first video data 150. The server device 102 may then acquire additional information related to each identified participant. As an example, the server device 102 may determine an appearance of each participant, such as a gender, a hair color/style, a facial feature positioning, an article of clothing, a color of clothing, a presence of other accessories (e.g., jewelry), and so forth. As another example, the server device 102 may determine a location of each participant in a framing of the first video data 150. The server device 102 may further determine, from the list of participants, a speaker participant providing the audio data corresponding to the first video data 150. For instance, the server device 102 may utilize spatial awareness in which a location and/or direction of the received audio data in a framing is determined, and the participant at or corresponding to the location of the received audio data is determined. In other words, the location of the audio data in the framing corresponds to the location of one of the participants in the framing, and this participant is selected as the speaker participant.

In response to determining the information related to the participants, the server device 102 may dynamically generate animated avatars to present sign language content for each speaker participant (i.e., each participant determined to be speaking), including avoiding or removing (e.g., fading out over time) animated avatar generation for non-speaker participants (i.e., each participant determined not to be speaking). By way of example, the server device 102 may generate an avatar having an appearance that corresponds to the appearance of the speaker participant. For instance, the generated avatar may be of the same gender, have a similar hair color/style, have a similar facial feature positioning, wear the same article of clothing, wear clothing having the same color, and/or have the same accessories as compared to the speaker participant. Thus, the generated avatar may more clearly correspond to the speaker participant. Additionally, the server device 102 identifies words spoken by the speaker participant, interprets the words, and determines associated animations of the avatar to provide sign language gestures representing the words. To this end, the server device 102 may refer to stored information (e.g., data stored in the server device 102, data stored in data storage separate from and accessible by the server device 102) that map sign language gestures to each word, phrase, expression, or sentence interpreted from the spoken words. The server device 102 may then retrieve the mapped sign language gestures.

Upon determining the animations of the avatar to be implemented, the server device 102 may modify the first video data 150 to render the avatar in accordance with the animations and generate second video data 160 that includes the animated avatar. That is, the server device 102 may modify each framing of the first video data 150 to include the avatar, and the rendering of the avatar in each framing may collectively provide the sign language gestures representing the spoken words. In this manner, the second video data 160 presents information corresponding to the audio data via the animated avatar. In certain embodiments, the server device 102 may co-locate the avatar adjacent to the speaker participant. For instance, for one of the framings of the first video data 150, the server device 102 may render the avatar in the framing within a threshold distance of the determined location of the speaker participant within the framing. In this manner, both the appearance of the avatar corresponding to the speaker participant and the location of the avatar adjacent to the speaker participant may clearly indicate that the sign language content presented by the avatar corresponds to the audio data provided by (e.g., the words spoken by) the speaker participant. In additional or alternative embodiments, the server device 102 may render the avatar in the framing at any other suitable location. For example, a user may indicate a target location (e.g., at a bottom of a display screen) of the avatar, and the server device 102 may position the avatar at the target location regardless of the distance between the target location and the speaker participant corresponding to the avatar.

The server device 102 may then output the second video data 160 to the endpoint device 104 to cause the endpoint device 104 to present the second video data 160. By way of example, the endpoint device 104 includes a display 162, and the display 162 is configured to output a video based on the second video data 160 that includes the animated avatar. A user may then view the video output by the display 162 and receive information originally provided via audio data by observing the animated avatar included in the second video data 160 (e.g., without having to rely on audio data alone).

In embodiments in which multiple speaker participants are identified from the first video data 150, the server device 102 may generate separate avatars for different speaker participants. Thus, each avatar may be dedicated to providing sign language content for a corresponding speaker participant. In this manner, sign language content corresponding to different speaker participants may be more discernible from one another. For example, a user may be able to determine respective words spoken by each speaker participant based on the specific avatar corresponding to each speaker participant. To this end, the server device 102 may distinguish the audio data provided by different speaker participants. For instance, the server device 102 may identify certain voice characteristics, such as tone, pitch, accent, rate, phonation, and/or volume, associated with the audio data and associate the voice characteristics with a corresponding speaker participant. In this manner, the server device 102 may utilize voice recognition to map received audio data to its associated speaker participant. The server device 102 may then animate the avatars based on the audio data to provide sign language for the respective speaker participant.

Furthermore, the server device 102 may not generate an avatar for participants determined not to be a speaker participant (e.g., participants who are not speaking). Indeed, the server device 102 may remove or fade out avatars previously presented for previously identified speaker participants. In this way, the quantity of avatars being presented may be limited to the quantity of active speaker participants to avoid overloading a user with information or diverting the attention of the user away from avatars of speaker participants, and a new avatar is dynamically generated and presented each time a participant initiates speech. As such, the user may more easily determine words actively spoken by different speaker participants and intake desirable information.

For example, in the illustrated second video data 160, which has been modified to include separate avatars for each speaker participant, a first avatar 164 is provided for the first participant 154 and a second avatar 166 is provided for the second participant 156. That is, the server device 102 determines each of the first participant 154 and the second participant 156 is a speaker participant, and the server device 102 therefore generates the respective first avatar 164 and second avatar 166. For instance, the avatars 164, 166 may be presented to perform simultaneous gesture of sign language for the participants 154, 156 providing overlapping speech to enable a user to observe and understand multiple speeches. The server device 102 may generate the first avatar 164 to have an appearance corresponding to that of the first participant 154 and the second avatar 166 to have an appearance corresponding to that of the second participant 156. Furthermore, the server device 102 may render the first avatar 164 adjacent to the first participant 154 and the second avatar 166 adjacent to the second participant 156. In certain embodiments, the server device 102 may render the avatars 164, 166 to avoid overlap or overlay with one another and/or with any of the other participants 154, 156, 158. To this end, the server device 102 may adjust a position and/or a size of the avatars 164, 166. In this manner, the avatars 164, 166 being presented may be visible without reducing visibility of other potentially important visual content (e.g., appearance of the participants 154, 156, 158) in the second video data 160.

In some embodiments, the server device 102 may also modify the first video data 150 to present participant identifier information for each avatar 164, 166. As an example, the participant identifier information may include a name, a company, a job position, and the like of a corresponding participant. The server device 102 may then render the participant identifier information adjacent to the avatars 164, 166 and further indicate the speaker participant corresponding to each avatar 164, 166. For example, the server device 102 may render first participant identifier information 168, which corresponds to the first participant 154, adjacent to the first avatar 164 to indicate the first avatar 164 corresponds to the first participant 154. The server device 102 may also render second participant identifier information 170, which corresponds to the second participant 156, adjacent to the second avatar 166, to indicate the second avatar 166 corresponds to the second participant 156. As such, correspondence between the avatars 164, 166 and the associated participant 154, 156 may further be easily determined, such as when multiple avatars 164, 166 may have a similar appearance to one another.

It should be noted that other information related to audio data may also be provided. By way of example, a language spoken by the participants 154, 156 and/or being gestured by the avatars 164, 166 may be provided. For instance, sign language provided by the avatars 164, 166 may include any variation of sign language, such as American Sign Language, Spanish Sign Language, French Sign Language, and so forth, and the type of sign language may be displayed to facilitate interpretation of the gestures. Indeed, the words spoken by any of the participants 154, 156 may be in a first language (e.g., English), whereas the sign language content provided by the avatars 164, 166 correspond to a second language (e.g., Spanish). In other words, spoken words can be translated for output via sign language corresponding to a different language. Additionally or alternatively, non-speech or participant related audio content, such as music, background noise, and/or sound effects may be provided by another avatar. Such information being provided may further facilitate observation and comprehension of information provided by the video data.

In the illustrated embodiment, an avatar is not generated for the third participant 158. For example, the server device 102 may determine that the third participant 158 is not a speaker participant, and the server device 102 therefore does not generate an avatar for the third participant 158. As such, a user viewing the second video data 160 may determine that the third participant 158 is not speaking based on an absence of an avatar corresponding to the third participant 158. The user may therefore focus on the first participant 154 and the second participant 156, who are Actively speaking, and their corresponding avatars 164, 166 more easily.

In some embodiments, a user of the endpoint device 104 may select whether sign language avatars are to be presented in the displayed video data. For example, the user may select to enable presentation of sign language avatars, and the second video data 160 having the avatars 164, 166 may be output in response. Alternatively, the user may select to disable presentation of sign language avatars, and the first video data 150 (e.g., unmodified video data) that does not include the avatars 164, 166 may be output instead. In this way, the user may possess greater control to indicate whether sign language content is to be provided. The user selection indicative of whether sign language content is to be provided may be stored as a user preference (e.g., associated with a specific login credential, a specific endpoint device 104, or other identifier of a user). Thus, the server device 102 may retrieve the user preference (e.g., upon login to the endpoint device 104 and/or connection of the endpoint device 104 with the server device 102) and automatically determine whether to suitably provide video data that includes sign language avatars without having to receive a separate user input.

Figure 3:
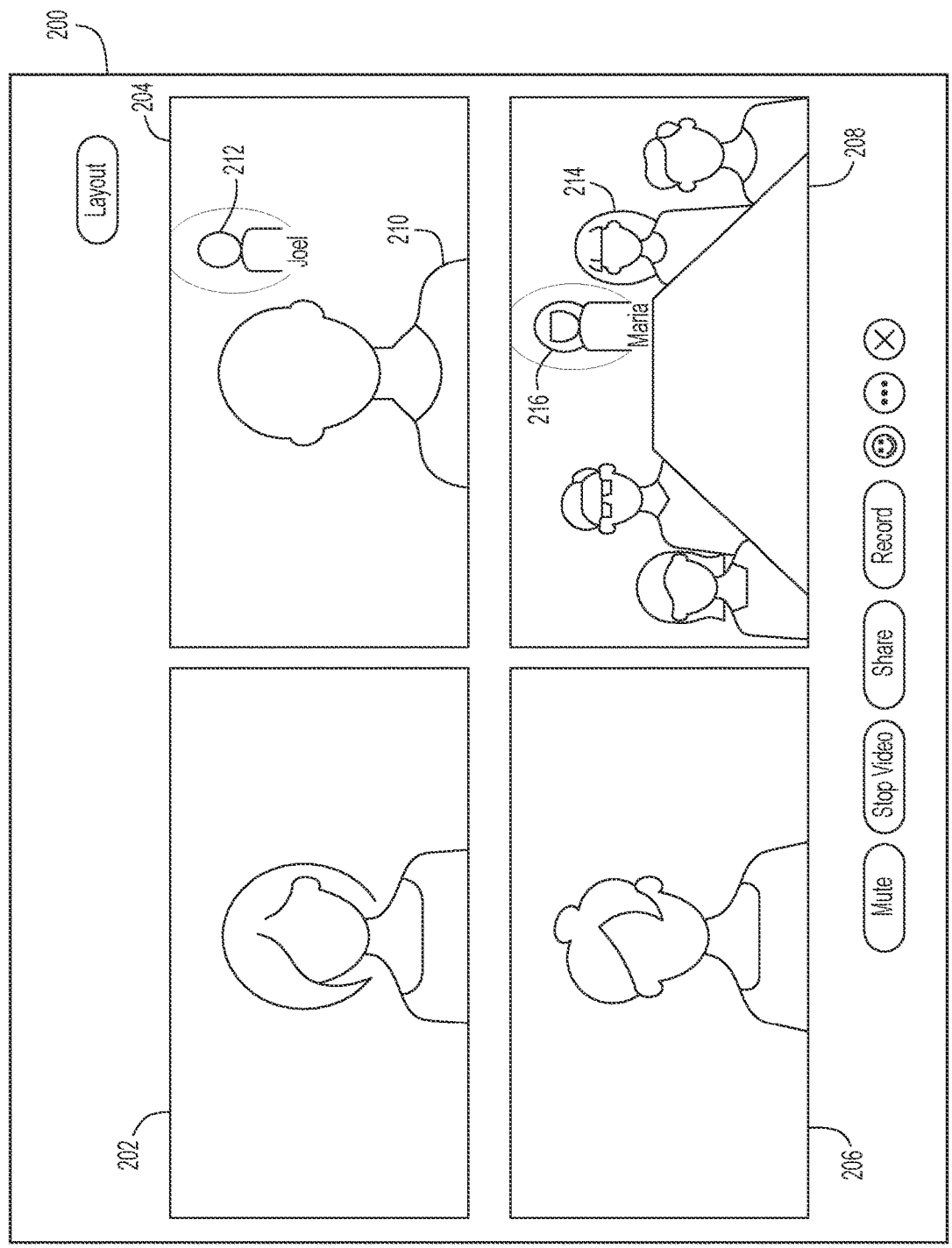
FIG. 3 shows example video data that includes animated avatars presenting sign language content, according to an example embodiment.

FIG. 3 illustrates example video data 200 that may include animated avatars presenting sign language content. The video data 200 may include a compilation or collection of multiple, separate video data initially received and subsequently modified to include an animated avatar. For example, the video data 200 may include first video data portion (window) 202 associated with a first endpoint device, second video data portion (window) 204 associated with a second endpoint device, third video data portion (window) 206 associated with a third endpoint device, and fourth video data portion (window) 208 associated with a fourth endpoint device. By presenting each video data portion 202, 204, 206, 208 at the same time, a participant viewing the video data 200 may be able to intake information provided by different participants associated with the different endpoint devices. Any of the video data portions 202, 204, 206, 208 may also include sign language content.

For example, the server device 102 may determine that a first speaker participant 210 of the second video data portion 204 is providing audio data, and the server device 102 may generate a first animated avatar 212 corresponding to the first speaker participant 210 and presenting sign language content corresponding to the audio data provided by the first speaker participant 210. The server device 102 may also determine that a second speaker participant 214 of the fourth video data portion 208 is providing audio data, and the server device 102 may generate a second animated avatar 216 corresponding to the second speaker participant 214 and presenting sign language content corresponding to the audio data provided by the second speaker participant 214. In the illustrated embodiment, the fourth video data portion 208 includes multiple participants. Using the techniques discussed herein, the server device 102 may determine which of the participants of the fourth video data portion 208 is a speaker participant and generate/render the second animated avatar 216 based on the determined speaker participant. Animated avatars may not be generated for the participants determined not to be speaker participants. For instance, the server device 102 may determine that neither the first video data portion 202 nor the third video data portion 206 includes a speaker participant. Thus, each of the first video data portion 202 and the third video data portion 206 may be absent of an avatar.

The server device 102 may render the animated avatars 212, 216 adjacent to their corresponding speaker participant 210, 214. Moreover, the server device 102 may render the animated avatars 212, 216 within the associated video data portion 204, 208 of their corresponding speaker participant 210, 214. That is, the server device 102 may render the first animated avatar 212 within the second video data portion 204 associated with the first speaker participant 210, and the server device 102 may render the second animated avatar 216 within the fourth video data portion 208 associated with the second speaker participant 214. In this manner, the participant viewing the video data 200 may more easily determine to which speaker participant 210, 214 each animated avatar 212, 216 corresponds.

In some embodiments, the server device 102 may generate any of the animated avatars 212, 216 based on an appearance of their corresponding speaker participant 210, 214. In additional or alternative embodiments, the server device 102 may generate any of the animated avatars 212, 216 based on identifier information associated with the corresponding endpoint device. For instance, the server device 102 may receive login information (e.g., login credentials, such as a username and/or password) and/or device information from the second endpoint device associated with the second video data portion 204. The server device 102 may then reference stored data that indicates the login/device information is associated with the first animated avatar 212 (e.g., a previously generated and stored animated avatar). Thus, the server device 102 may retrieve the first animated avatar 212 based on the received login/device information. That is, in addition to or as an alternative to generating the animated avatars 212, 216 based on the determined appearance of the corresponding speaker participants 210, 214, the server device 102 may generate the animated avatars 212, 216 based on stored data. Indeed, in certain embodiments, a participant may customize their avatar (e.g., to have a non-human appearance, to have the same appearance during each video session), such as by selecting their avatar features from a library of available avatar features, and the customized avatar may be associated with their login/device information. Thus, the customized avatar may be used when the server device 102 detects the login/device information regardless of the actual appearance of the participant. In this manner, even when the server device 102 is unable to determine an appearance of a participant (e.g., the camera of the endpoint device 104 is turned off or obstructed), the server device 102 may generate a corresponding animated avatar based on received login/device information. Additionally, in some embodiments, certain aspects of an avatar, such as facial features and/or hair color, may be customized by a participant, while other aspects of the avatar, such as clothing, may be dynamically determined and adjusted. In further embodiments, if the server device 102 is unable to determine an appearance of the participant and is unable to determine an associated avatar based on identifier information (i.e., no avatar specific to the participant may be determined), the server device 102 may generate a generic, default, or other pre-determined avatar for the participant. In further embodiments still, the server device 102 may use voice profiling to generate aspects of the avatar based on voice recognition/analysis (e.g., to identify a potential participant having a stored and recognized voice, along with an avatar previously generated for the participant) As such, an animated avatar may be provided even when information regarding a participant is limited.

As discussed herein, a user may select whether sign language content is to be provided. In certain embodiments, the user may select whether sign language content is to be provided for specific video portions (e.g., for video data received from specific endpoint clients). By way of example, the user may be able to receive/perceive audio data associated with the first endpoint device, the second endpoint device, and the third endpoint device. Thus, the user may indicate that no sign language content is desired for the first video data portion 202 associated with the first endpoint device, for the second video data portion 204 associated with the second endpoint device, or for the third video data portion 206 associated with the third endpoint device. However, the user may not be able to receive/perceive audio data associated with the fourth endpoint device. For example, there may be multiple speaker participants speaking to the fourth endpoint device, and the words spoken by the speaker participants may interfere with one another and hinder understanding of each individual speech. Thus, the user may indicate that sign language content is desired for the fourth video data portion 208 associated with the fourth endpoint device to enable better understanding of the speaker participants. In this manner, the user may have more granular control of whether sign language content is provided, and video data and/or audio data may be more suitably provided to the user.

Figure 4:
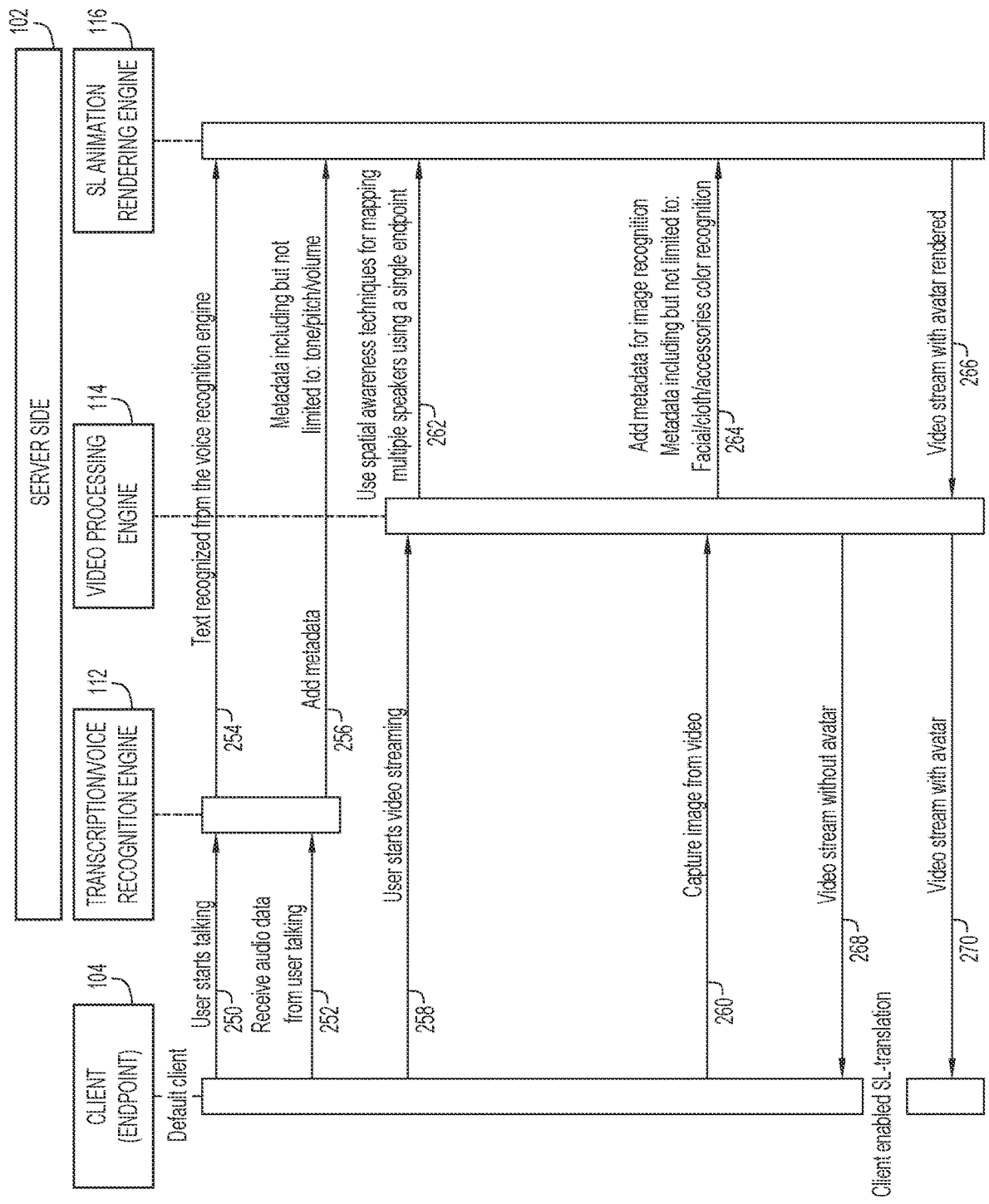
FIG. 4 is a sequence diagram depicting operations of an endpoint device and a server device to provide sign language content, according to an example embodiment.

FIG. 4 is a sequence diagram depicting operations of the endpoint device 104 and the server device 102 to provide sign language content. At step 250, a user begins speaking. As a result, at step 252, the endpoint device 104 (e.g., the sensor 152) may receive audio data of the user's speech and provide the audio data to the transcription engine 112 of the server device 102. At step 254, the transcription engine 112 may then identify words or text based on the audio data and transmit the identified words to the animation rendering engine 116. At step 256, the transcription engine 112 may extract metadata from the audio data and transmit the metadata to the animation rendering engine 116. The metadata may include voice data (e.g., tone, pitch, volume) used to discern words spoken by different users and/or a position or a direction in which the audio data is provided by the user.

At step 258, the user begins video streaming (e.g., turns on a camera of the endpoint device 104). As a result, at step 260, the endpoint device 104 (e.g., the sensor 152) may capture video data that includes multiple image data or framing and provide the video data to the video processing engine 114. At step 262, the video processing engine 114 may determine the location of the user (e.g., the speaker participant) on a framing of the video data and transmit the location information to the animation rendering engine 116. At step 264, the video processing engine 114 may extract metadata from the video data and transmit the metadata to the animation rendering engine 116. Such metadata may include an appearance (e.g., facial appearance, articles of clothing, other accessories) of the user and/or device data, such as media access control (MAC) data, used to distinguish the endpoint device providing the audio data from other endpoint devices.

Using the information received from the transcription engine 112 and/or from the video processing engine 114, the animation rendering engine 116 may generate an animated avatar and modify the received video data to include the animated avatar. For instance, the animation rendering engine 116 may generate the animated avatar to have an appearance similar to the appearance of the user, as provided by the video processing engine 114. The animation rendering engine 116 may also provide the avatar with animations to perform sign language gestures representing the words spoken by the user, as provided by the transcription engine 112. The animation rendering engine 116 may further associate the avatar with the specific metadata provided by the transcription engine 112 to differentiate the avatar from other possible users. By way of example, the animation rendering engine 116 may associate the avatar with the user, and not with other users of the same video data, based on the voice data. Additionally or alternatively, the animation rendering engine 116 may associate the avatar with the user, and not users of other endpoint devices, based on the device data. Upon generating the animated avatar, the animation rendering engine 116 may modify the video data to render the animated avatar on a framing of the video data based on the location of the user in the framing, as provided by the video processing engine 114. For example, the animation rendering engine 116 may position the animated avatar within a threshold distance of the location of the user.

At step 266, the animation rendering engine 116 transmits modified video data that includes the animated avatar to the video processing engine 114 for selective transmission to the endpoint device 104. As an example, at step 268, the video processing engine 114 may determine that video data without the animated avatar is to be provided to the endpoint device 104, and the video processing engine 114 therefore transmits the video data without the animated avatar (e.g., by transmitting the unmodified video data received from the endpoint device 104) to the endpoint device 104. For instance, a user of the endpoint device 104 may provide a user input that indicates no sign language content is to be provided with the video data, and the video processing engine 114 may determine that video data without the animated avatar is to be provided to the endpoint device 104 based on the user input. As another example, at step 270, the video processing engine 114 may determine that video data with the animated avatar is to be provided to the endpoint device 104 (e.g., as indicated by a user input), and the video processing engine 114 therefore transmits the video data with the animated avatar to the endpoint device 104. In some embodiments, however, the video processing engine 114 performs both step 268 and step 270 for the same endpoint device 104. That is, the video processing engine 114 transmits both the video data with the animated avatar and the video data without the animated avatar to the endpoint device 104. The endpoint device 104 may then select which transmitted video data to be used for display, such as based on a user input or user preference indicative of whether sign language content is to be provided.

In an example, the animated avatars may be generated and encoded as a data stream separate from the originally received video data. The data stream may then be synchronized with the originally received video data (e.g., the animation of the avatars is synchronized with the animation of the speaker participants) and applied as a layer to the originally received video data. Further, the animated avatar data stream may be tagged/flagged (e.g., by the animation rendering engine 116) to enable the video processing engine 114 to recognize the data stream separately from the originally received video data. As such, the video processing engine 114 may readily be able to selectively apply the data stream layer to the originally received video data, thereby enabling or avoiding presentation of animated avatars, such as based on a user input.

In certain embodiments, the video processing engine 114 may transmit the video data, with or without the animated avatar, based on various device data. For instance, the video processing engine 114 may determine, based on the device data, a specific endpoint device 104 that is to receive video data with the animated avatar, a specific endpoint device 104 that is to receive video data without the animated avatar, and/or a specific endpoint device 104 that is not to receive video data. In an example, the video processing engine 114 may receive video data from the first endpoint device 104-1 and determine first device data of the first endpoint device 104-1. The video processing engine 114 may determine that the video data, with or without the animated avatar, is not to be re-transmitted back to the first endpoint device 104-1 (e.g., the users of the first endpoint device 104-1 do not need to view video data of themselves). Instead, the video processing engine 114 may determine the second endpoint device 104-2 communicatively coupled to the first endpoint device 104-1 is to receive video data, and the video processing engine 114 may determine second device data of the second endpoint device 104-2. The video processing engine 114 may then transmit the video data to the second endpoint device 104-2 based on the second device data in response.

In additional or alternative embodiments, the endpoint device 104 may selectively display the video data with or without the animated avatars. For example, the video processing engine 114 may transmit the originally received video data and the animated avatar data stream to the endpoint device 104. The endpoint device 104 may then determine whether to display the originally received video data with the animated avatar data stream, thereby displaying the animated avatars, or to display the originally received video data without the animated avatar data stream, thereby blocking display of animated avatars. In this manner, the endpoint device 104 may suitably display video data (e.g., based on a received user input).

By enabling the server device 102 to perform the video processing, audio processing, and animation rendering operations, greater scalability and sustainability of operation may be achieved. That is, the server device 102 may enable multiple, different endpoint devices 104 to provide suitable video data that contains sign language content without having to modify or configure each of the endpoint devices 104 (e.g., to enable each individual endpoint device 104 to process video/audio data to generate an animated avatar). Thus, sign language content may be more readily implemented for presentation.

Each of FIGS. 5-9 described below illustrates a method for operating with respect to a sign language avatar. In some embodiments, each method may be performed by the same device, such as by the endpoint device 104 and/or by the server device 102. In additional or alternative embodiments, certain steps of the same method and/or of different methods may be performed by different devices. Moreover, it should be noted that any of the methods may be performed in a different manner than depicted. For example, a step may not be performed, an additional step may be performed, and/or certain steps may be performed in a different order. Further, the steps of the same method or of different methods may be performed in any relation with one another, such as concurrently or in response to one another. Further still, the steps of any of the methods may be repeatedly performed.

Figure 5:
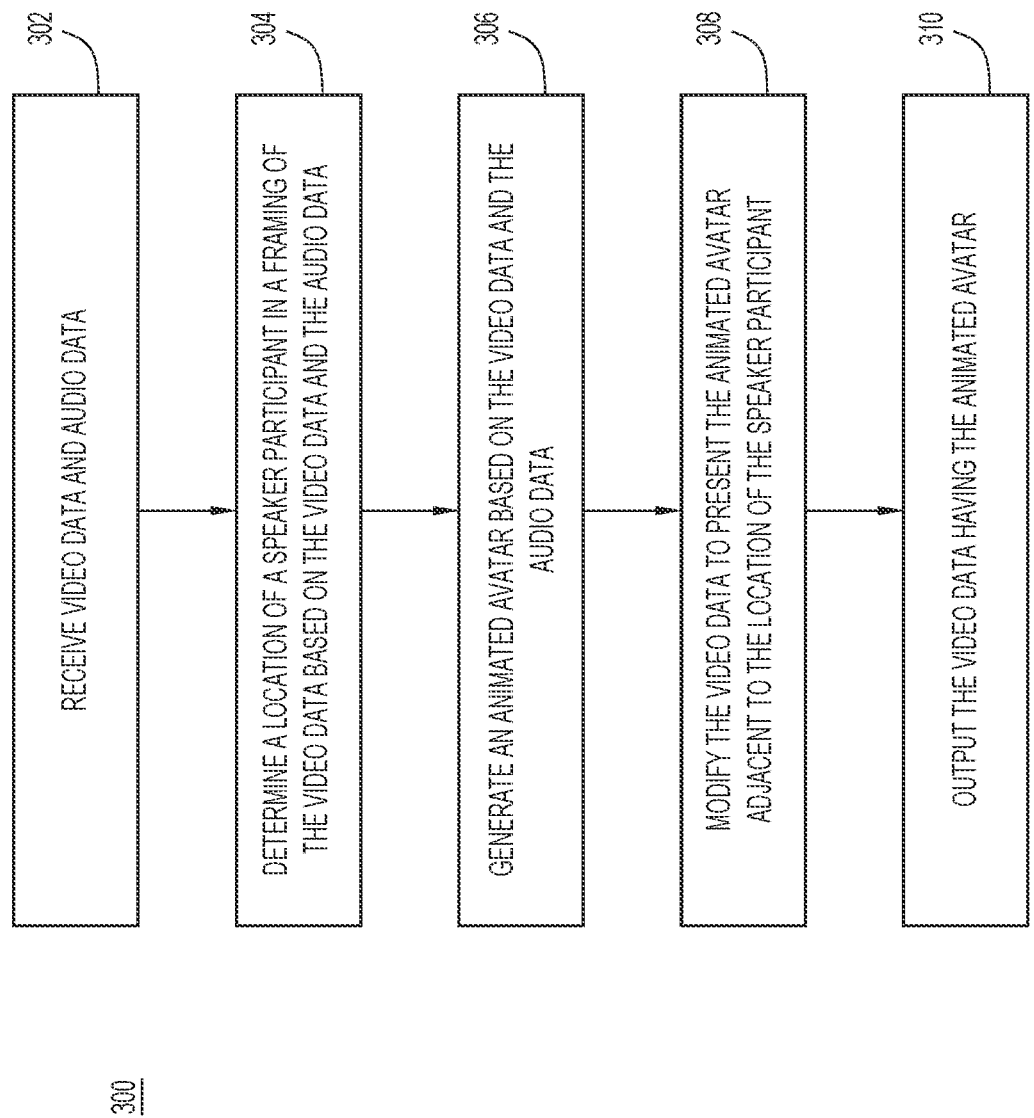
FIG. 5 is a flowchart illustrating a method of modifying video data to include sign language content, according to an example embodiment.

FIG. 5 is a flowchart illustrating a method 300 of modifying video data to include sign language content, such as during a video session (e.g., a meeting or conference). At step 302, video data and audio data are received. For example, the video data may include multiple framings having one or more participants. The audio data may include words spoken by one of the participants.

At step 304, a location of a speaker participant in a framing of the video data is determined based on the video data and the audio data. For instance, a first location of the audio data is determined. Additionally, second locations of each participant in the framing are determined. A speaker participant is selected from the participants based on the second location of the speaker participant corresponding to the first location of the audio data, and the second location of the speaker participant is subsequently identified.

At step 306, an animated avatar is generated based on the video data and the audio data to present the information included in the audio data. For example, the animated avatar is generated to provide sign language representing the words spoken by the speaker participant. To this end, the words spoken by the speaker participant may be identified from the audio data. Additionally, the sign language gestures mapped to each word, phrase, expression, and/or sentence may be determined (e.g., from stored data). The animated avatar may then be generated to provide the determined sign language gestures.

At step 308, the video data is modified to present the animated avatar proximate to the location of the speaker participant. For example, the animated avatar is overlayed on the framing of the video data at a third location that is within a threshold distance of the second location of the speaker participant in the framing. By rendering the animated avatar proximate to the speaker participant, a user viewing the modified video data may more easily determine that the animated avatar corresponds to that specific speaker participant. Moreover, the user viewing the modified video data may be able to simultaneously view the speaker participant and the proximately positioned animated avatar. In this manner, the animated avatar may not divert the attention of the user from other content (e.g., hand gestures and/or facial expressions of the speaker participant) of the video data. Further still, by overlaying the animated avatar onto the video data, original content of the video data generally may not be affected. For instance, the user may be able to view the content of the video data more easily as compared to, for example, video data having a reduced size to accommodate positioning of an animated avatar adjacent to, instead of superimposed on, the video data. However, in embodiments in which the location of the speaker participant is not identifiable (e.g., the speaker participant is located off-screen or otherwise outside of a visually detectable range), the animated avatar may be positioned at a default location, such as near a right edge or a left edge of the video data based on a detected location of the source of the audio data (e.g., the direction in which the speaker participant is offset from the visual range associated with the video data).

At step 310, the video data having the animated avatar is output. For example, the video data is transmitted to an endpoint device, and the endpoint device displays the video data. In certain embodiments, the video data having the animated avatar is output to an endpoint device in response to determining a user of the endpoint device indicates sign language content is to be presented. In such an example, audio data may not be transmitted to the endpoint device. That is, the endpoint device may present visual content (e.g., the video data, the animated avatar) and not audio content. However, in another example, audio data may also be transmitted to the endpoint device for presentation (e.g., for participants who have partial hearing). Additionally, video data without the animated avatar may be output to an endpoint device in response to determining a user of the endpoint device indicates no sign language content is to be presented. Instead, for instance, the originally received video data may be transmitted to the endpoint device for output. The originally received audio data may also be transmitted to the endpoint device for output in response to determining the user of the endpoint device indicates no sign language content is to be presented. Thus, the video data having the animated avatar may be selectively output to be presented in a suitable manner.

Figure 6:
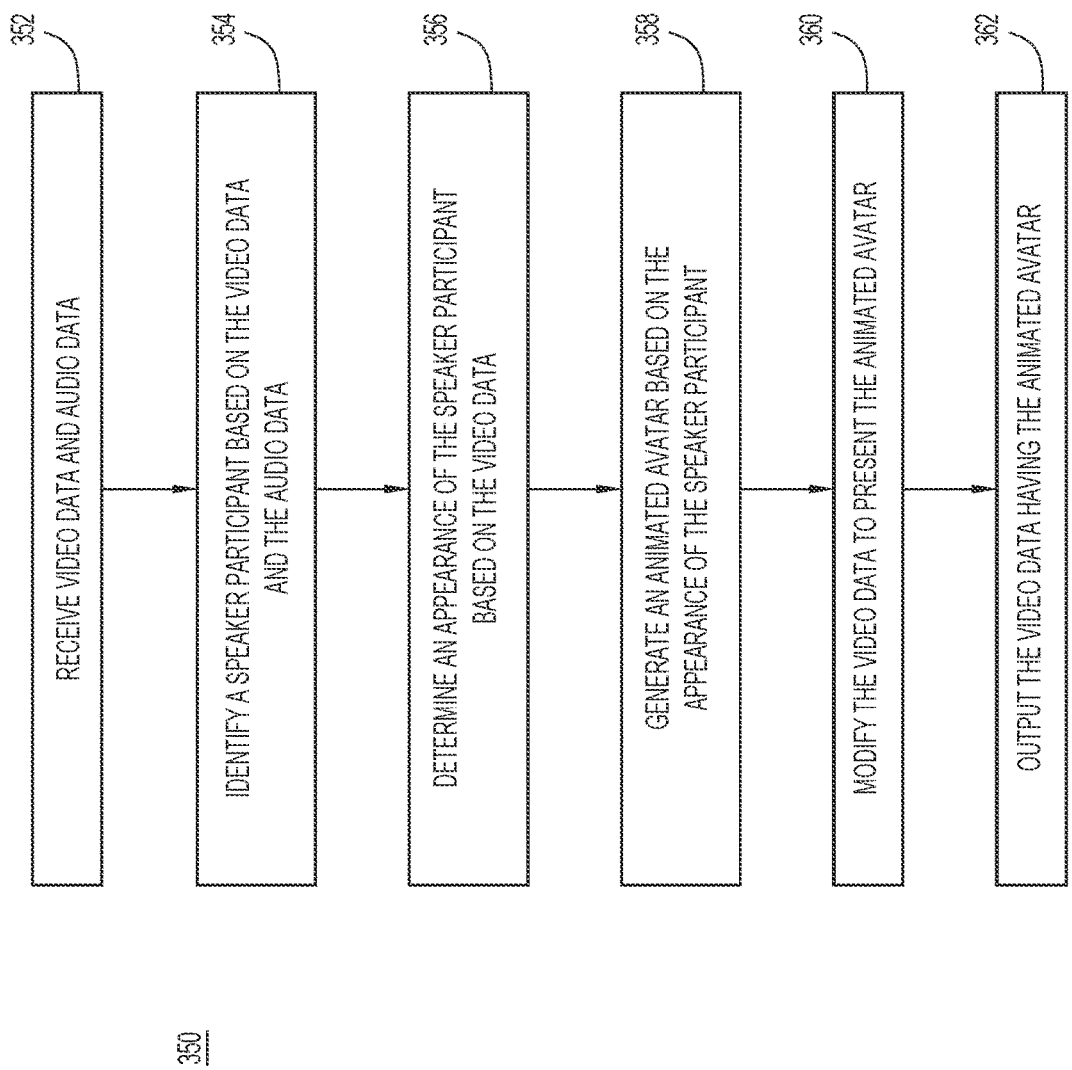
FIG. 6 is a flowchart illustrating another method of modifying video data to include sign language content, according to an example embodiment.

FIG. 6 is a flowchart of a method 350 of modifying video data to include sign language content. At step 352, video data and audio data are received. At step 354, a speaker participant is identified based on the video data and the audio data, such as based on the location of the speaker participant corresponding to the location of the received audio data. At step 356, an appearance of the speaker participant is determined based on the video data. By way of example, a gender, a hair color/style, a facial appearance, an article of clothing, a color of clothing, and/or another accessory (e.g., jewelry) of the speaker participant is determined. At step 358, an animated avatar is generated to have an appearance corresponding to the appearance of the speaker participant to provide sign language. For example, the generated animated avatar may be of the same gender, have the same hair color/style, have the same facial appearance, wear the same article of clothing, wear clothing of the same color, possess the same accessory, and so forth as that of the participant. At step 360, the video data is modified to present the animated avatar, and at step 362, the modified video data having the animated avatar is output. By generating an animated avatar having a similar appearance as that of the speaker participant, the user viewing the video data may more easily determine the animated avatar corresponds to the speaker participant and not, for example, to other participants (e.g., non-speaking participants) who do not have a similar appearance as that of the animated avatar. Thus, the user may more easily determine which participant is speaking and associate the sign language gestures provided by the animated avatar to the participant.

In this manner, the video data being received and used to generate the animated avatar is the same video data being modified to present the animated avatar. Thus, the appearance of the animated avatar is dynamically generated and can be adjusted to correspond to the speaker participant more closely. By way of example, during initiation of a video session, the speaker participant may wear a first article of clothing (e.g., a shirt), and an animated avatar having the first article of clothing may be generated in response. However, at a later point in the same video session, the speaker participant may have changed to wear a second article of clothing (e.g., a jacket). The animated avatar corresponding to the speaker participant may be updated in response to include the second article of clothing as well. In this way, the appearance of the speaker participant is tracked and monitored in real-time so that the appearance of the corresponding animated avatar is constantly updated. As such, a close resemblance of the animated avatar to the speaker participant is maintained to enable the user viewing the video data to continue to associate the animated avatar with the speaker participant. Using the video data to generate the animated avatar and to include the animated avatar may also reduce computing power and/or time to provide video data having the animated avatar. For example, instead of having to receive separate imagery (e.g., user-provided image data) to generate the animated avatar, the same video data may be used to perform both avatar generation and avatar presentation operations, thereby reducing a quantity of additional input information (e.g., image data) and/or processing operations (e.g., transmission of image data) used to provide the video data having the animated avatar.

Figure 7:
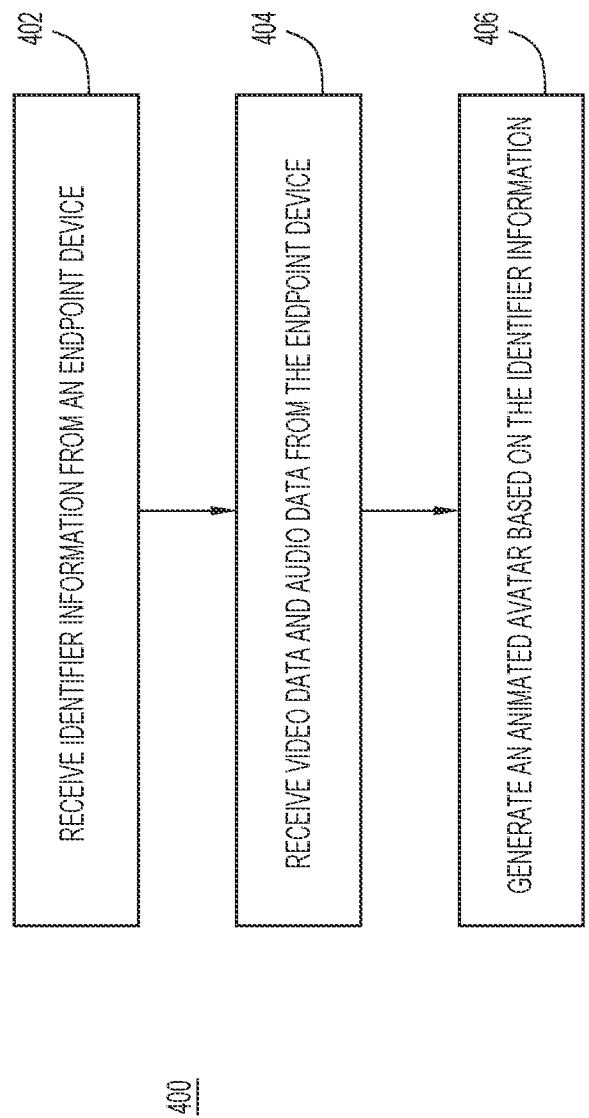
FIG. 7 is a flowchart illustrating a method of generating an animated avatar to present sign language content, according to an example embodiment.

FIG. 7 is a flowchart of a method 400 of generating an animated avatar to present sign language content. At step 402, identifier information is received from an endpoint device. The identifier information may include login information or data (e.g., login credentials), voice information or data (e.g., characteristics of voice or speech), and/or device information or data (e.g., MAC address). At step 404, video data and audio data from the endpoint device are received. At step 406, an animated avatar is generated based on the identifier information to provide sign language. By way of example, stored data may associate the identifier information with a previously created avatar appearance. For instance, an animated avatar may have been previously generated for the speaker participant, such as based on a previous appearance of the user and/or based on a user input. The previously created avatar appearance may be retrieved and used for subsequent generations of the animated avatar. Indeed, the animated avatar may be generated to have the previously created avatar appearance regardless of the current or actual appearance of the speaker participant. In this manner, the animated avatar may be generated based on previous or stored information in addition to or as an alternative to sensed information (e.g., from received video data).

It should be noted that an animated avatar may also be generated to have an appearance based on any other suitable information. As an example, the appearance of the animated avatar may be based on a user input, which may indicate a customization provided by a user (e.g., by the speaker participant). Indeed, the user input may modify an initially generated appearance (e.g., an appearance generated based on a determined appearance of the speaker participant, an appearance generated based on identifier information) and/or provide an entirely new avatar appearance, thereby providing the user with more granular control of avatar generation. In further embodiments, the animated avatar may be generated to have a generic, default, or other pre-determined appearance in response to an associated appearance of the animated avatar being indeterminable based on the video data and/or other information related to the speaker participant. Thus, a suitable animated avatar may be generated using any available information.

Figure 8:
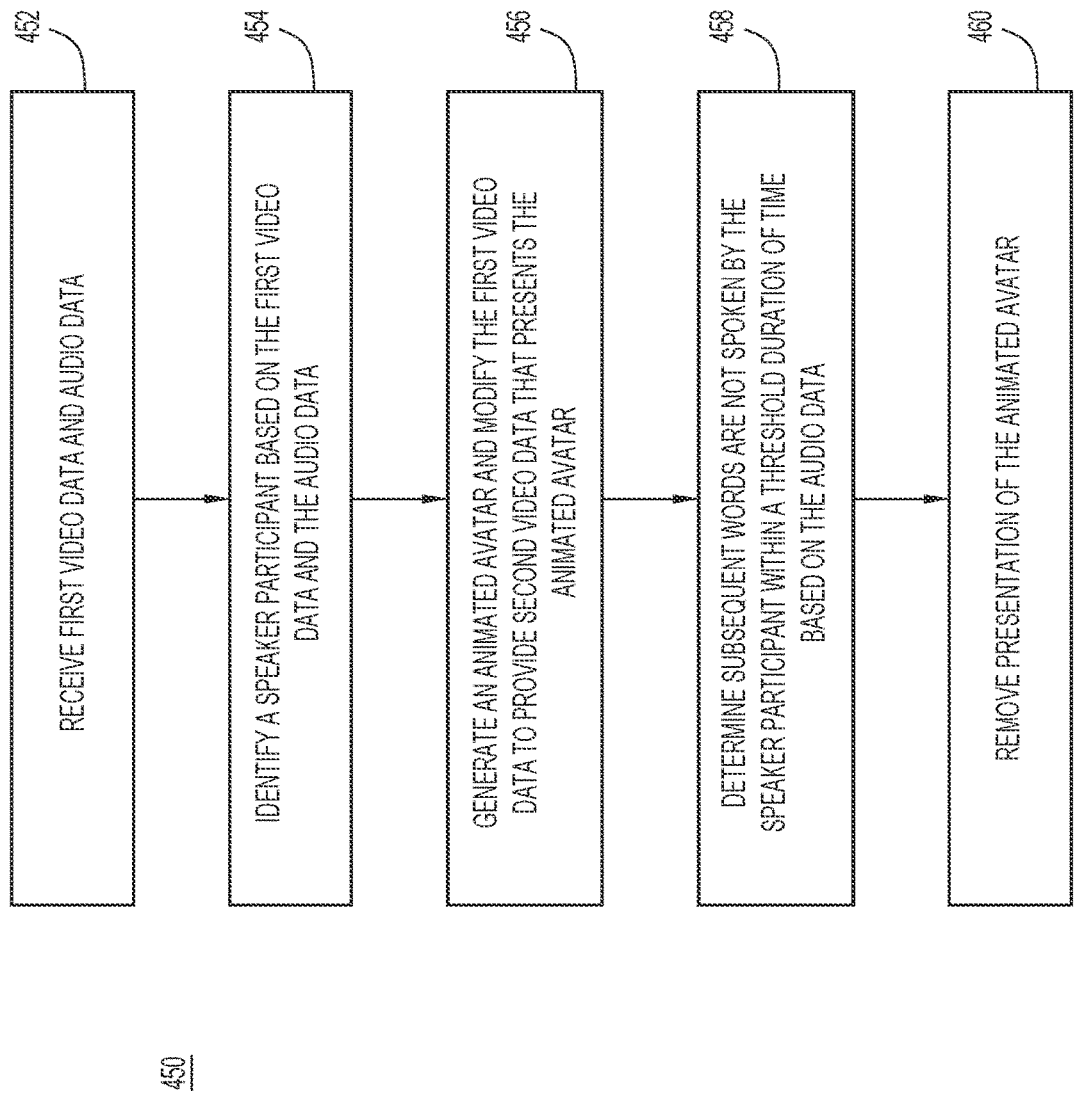
FIG. 8 is a flowchart illustrating a method of modifying video data to include and remove sign language content, according to an example embodiment.

FIG. 8 is a flowchart of a method 450 of modifying video data to include and remove sign language content. At step 452, first video data and audio data are received. At step 454, a speaker participant is identified based on the first video data and the audio data. That is, words spoken by the speaker participant are identified from the audio data. At step 456, an animated avatar is generated to provide sign language representing the words spoken by the speaker participant, and the first video data is modified to present the animated avatar, thereby providing second video data that includes the animated avatar. The second video data may then be transmitted for output. That is, while the speaker participant is identified, the first video data may be continually and repeatedly received and modified to include the animated avatar. Audio data may also be continually and repeatedly received for determining whether the speaker participant continues to speak.

At step 458, a determination is made that subsequent words are not spoken by the speaker participant within a threshold duration of time (e.g., a duration of time between 1 and 5 seconds, between 5 and 10 seconds, more than 10 seconds) of previously spoken words indicated by the received audio data. That is, the speaker participant may no longer be identified based on the first video data and the audio data. At step 460, presentation of the animated avatar may be removed in response to determining subsequent words are not spoken by the speaker participant within the threshold duration of time. In some embodiments, transparency of the animated avatar may be adjusted (e.g., to increase transparency or reduce opacity) to provide a visual effect in which the animated avatar is faded from display over time. In additional or alternative embodiments, the received first video data, which does not have the animated avatar, may be transmitted for output. As such, while the speaker participant is not identified (e.g., while there is an absence of words spoken by the speaker participant in the threshold duration of time after identification of the speaker participant), the first video data may no longer be modified to include the animated avatar that previously corresponded to the speaker participant. However, in embodiments in which other speaker participants are identified, the first video data may still be modified to include generated animated avatars corresponding to the other speaker participants. Additionally, in certain embodiments, the threshold duration of time may be adjusted to avoid constantly altering between presenting and removing animated avatars (e.g., flickering display of animated avatars) for a participant. For example, the threshold duration of time may be dynamically determined based on a frequency in which a participant speaks and/or a duration of time in pauses between speech provided by a participant. Indeed, different threshold durations of time may be associated with different participants based on respective characteristics of speech provided by the different participants.

In this manner, an animated avatar may be presented for a participant that is actively speaking, whereas an animated avatar may not be presented or may be presented with increased transparency for a participant who is not actively speaking. As such, a user may be more readily able to determine which participant is speaking and focus their attention on the specific animated avatar corresponding to the participant. Thus, the user may more easily understand sign language content that is actively being provided.

Figure 9:
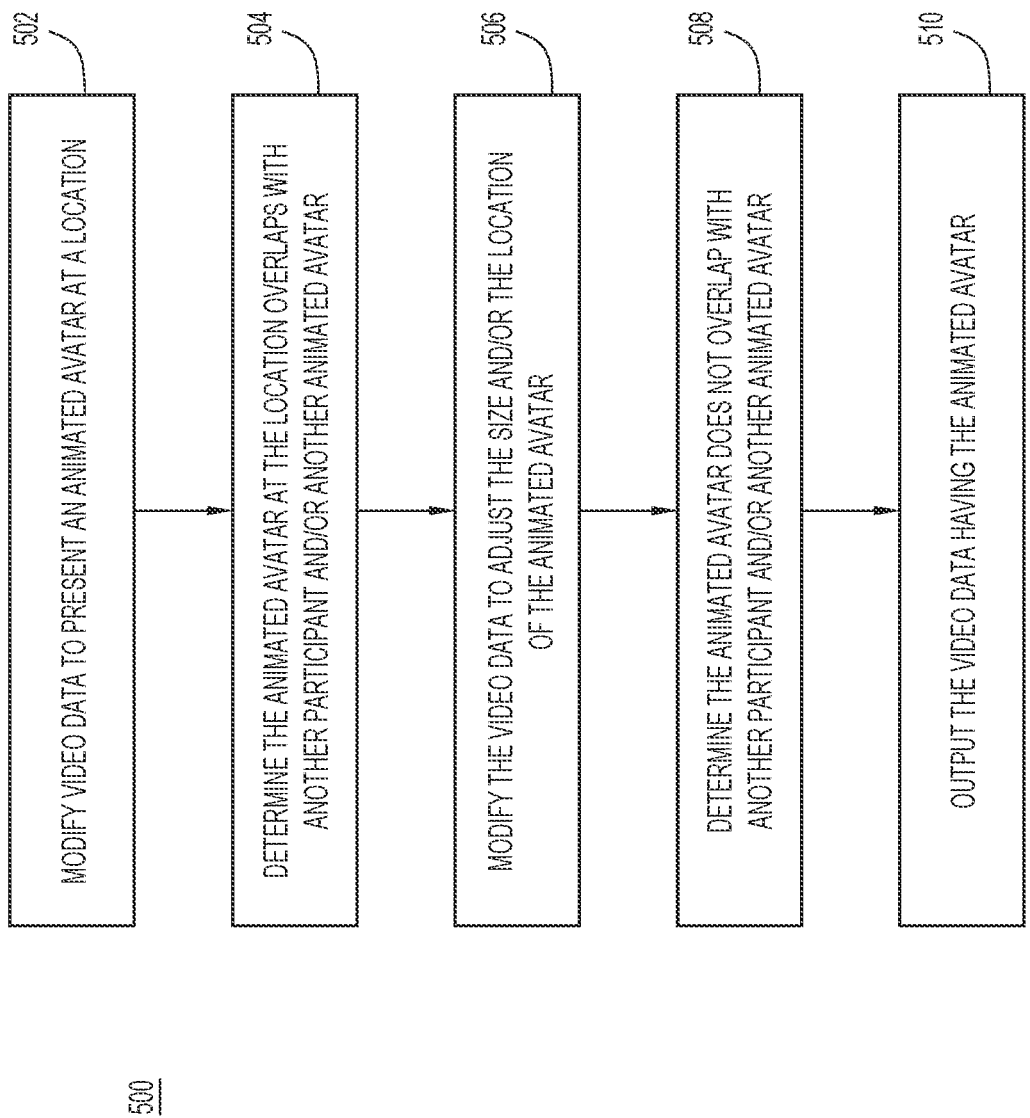
FIG. 9 is a flowchart illustrating a method of modifying video data to position an animated avatar to present sign language content, according to an example embodiment.

FIG. 9 is a flowchart of a method 500 of modifying video data to position an animated avatar to present sign language content. At step 502, video data is initially modified (e.g., in response to identifying a speaker participant) to present an animated avatar at a location of a framing of the video data. That is, the animated avatar is overlaid on the framing, such as within a threshold distance of its corresponding speaker participant. At step 504, a determination is made that the animated avatar at the location overlaps with another participant and/or another animated avatar. In other words, the overlaying of the animated avatar may cover or obstruct another participant and/or another animated avatar.

At step 506, the video data is further modified to adjust the size and/or the location of the animated avatar in response to the determination that the animated avatar at the location overlaps with another participant and/or another animated avatar. As an example, the size of the animated avatar is reduced. As another example, the animated avatar is moved to another location that is within the threshold distance of its corresponding speaker participant.

At step 508, a determination is made that the animated avatar no longer overlaps with another participant and/or another animated avatar as a result of the adjusted size and/or adjusted location of the animated avatar. That is, the animated avatar may be offset from other participants and/or other animated avatars. At step 510, the video data having the animated avatar is output in response to the determination that the animated avatar does not overlap with another participant and/or another animated avatar. In this way, the animated avatar is rendered in a manner that reduces its obstruction of other content being presented by the video data. That is, the video data is modified to present sign language content without hindering the ability of a user to view other information being presented. Thus, various information may be more clearly presented via the video data.

In certain embodiments, multiple animated avatars may remain in overlap, but display of the avatars may be adjusted to avoid visual obstruction of one another. By way of example, the transparency of one of the overlapping animated avatars can be increased to enable visualization of gestures provided by another of the overlapping animated avatars. As such, a user can view gestures provided by multiple animated avatars that are superimposed on one another, such as in situations in which a size and/or a location of animated avatars cannot be adjusted to force the animated avatars to remain in overlap with one another.

Figure 10:
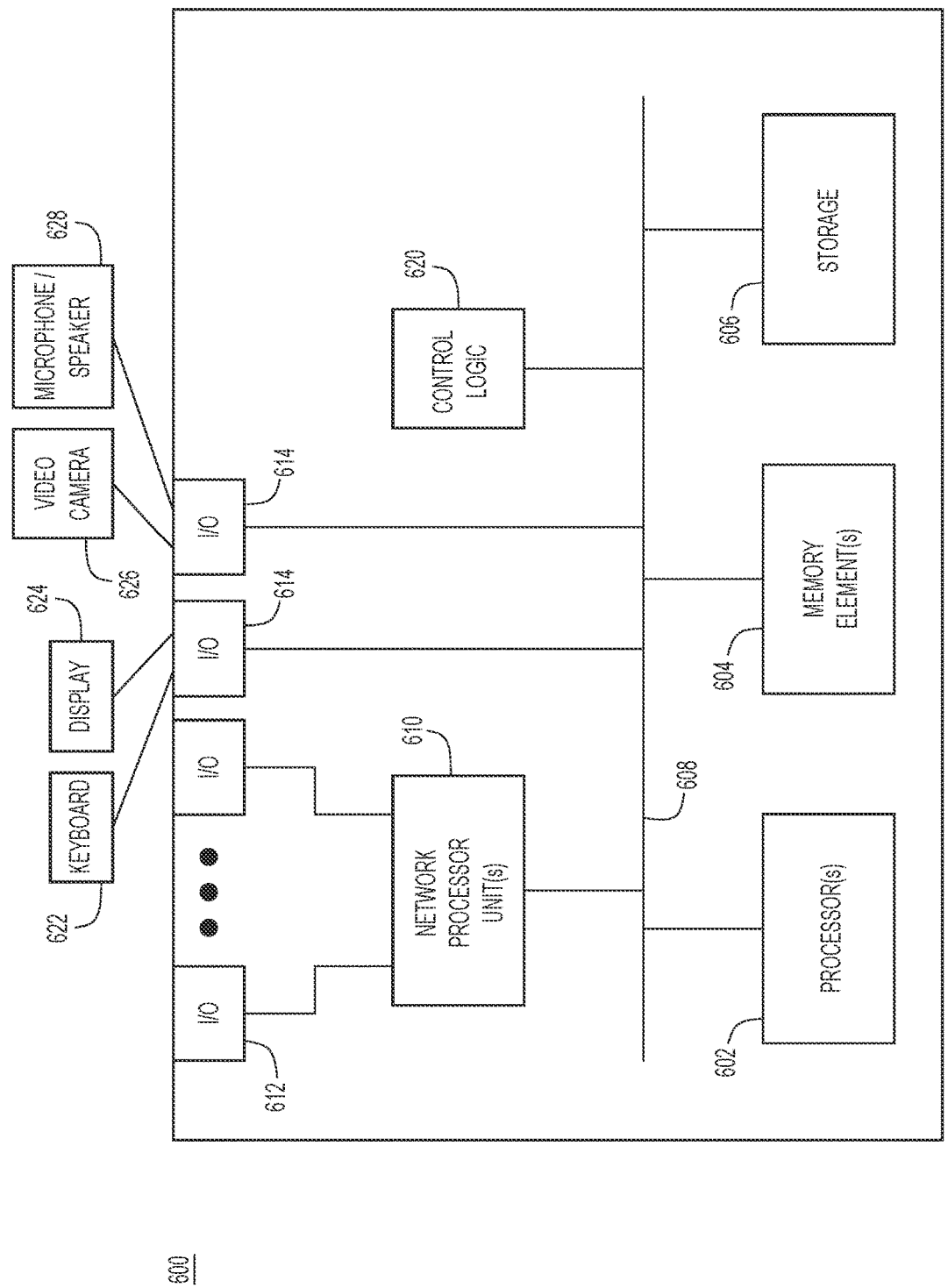
FIG. 10 is a hardware block diagram of a device that may be configured to perform endpoint device-based operations involved in presenting sign language content, according to an example embodiment.

Referring to FIG. 10, FIG. 10 illustrates a hardware block diagram of a computing/computer device 600 that may perform functions of an endpoint device or an end device associated with operations discussed herein in connection with the techniques depicted in FIGS. 1-9. In various embodiments, a computing device, such as computing device 600 or any combination of computing devices 600, may be configured as any devices as discussed for the techniques depicted in connection with FIGS. 1-9 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for the computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard 622, keypad, a touch screen, and/or any other suitable input and/or output device now known or hereafter developed. This may be the case, in particular, when the computing device 600 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 624 shown in FIG. 10, particularly when the computing device 600 serves as a user device as described herein. Display 624 may have touch-screen display capabilities. Additional external devices may include a video camera 626 and microphone/speaker combination 628. While FIG. 10 shows the display 624, video camera 626, and microphone/speaker combination 628 as being coupled via one of the I/O interfaces 614, it is to be understood that these components may instead be coupled to the bus 608.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 11:
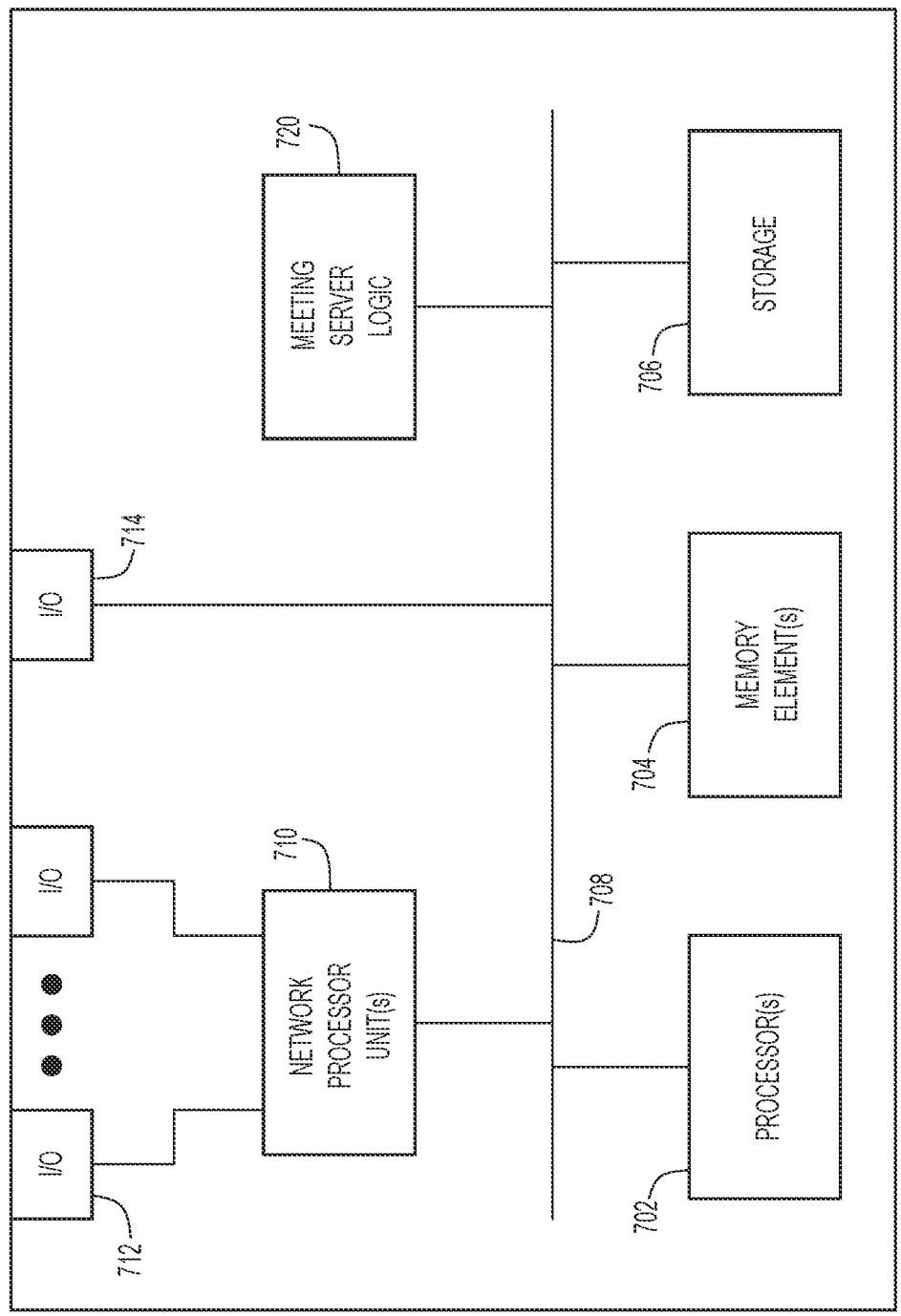
FIG. 11 is a hardware block diagram of a device that may be configured to perform server device-based operations involved in presenting sign language content, according to an example embodiment.

FIG. 11 illustrates a block diagram of a computing device 700 that may perform the functions of the server device(s) 102 described herein. The computing device 700 may include one or more processor(s) 702 (e.g., graphics processor(s) with a graphics processing unit acceleration), one or more memory element(s) 704, storage 706, a bus 708, one or more network processor unit(s) 710 interconnected with one or more network input/output (I/O) interface(s) 712, one or more I/O interface(s) 714, and server logic 720. In various embodiments, instructions associated with the server logic 720 are configured to perform the server operations described herein, including those depicted by the flow chart for methods 300, 350, 400, 450, 500 shown in FIGS. 5-9.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD- WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    receiving, via one or more processors, video data and audio data associated with respective participants in a video session;
    identifying, via the one or more processors, a speaker participant based on the audio data;

determining, via the one or more processors, an appearance of the speaker participant based on the video data;
generating, via the one or more processors, an animated avatar based on the appearance of the speaker participant;
determining, via the one or more processors, a location of the speaker participant in a framing of the video data based on the video data and the audio data;
rendering, via the one or more processors, the animated avatar in the video data at a position and having a first size based on the location of the speaker participant to provide sign language representing words spoken by the speaker participant;
determining, via the one or more processors, the position of the animated avatar overlaps with another speaker participant and/or another animated avatar in the video data;
adjusting, via the one or more processors, the animated avatar from the first size to a second size in response to determining the position of the animated avatar overlaps with another speaker participant and/or another animated avatar in the video data; and
outputting, via the one or more processors, the video data that includes the animated avatar having the second size in the video data.

2. The method of claim 1, comprising:
determining, via the one or more processors, subsequent words are not spoken by the speaker participant within a threshold duration of time after determining the words spoken by the speaker participant based on the audio data; and
removing, via the one or more processors, the animated avatar from the video data in response to determining the subsequent words are not spoken by the speaker participant within the threshold duration of time.

3. The method of claim 1, comprising:
receiving, via the one or more processors, identifier information corresponding to the speaker participant; and
generating, via the one or more processors, the animated avatar based on the identifier information.

4. The method of claim 1, wherein rendering, via the one or more processors, the animated avatar in the video data based on the location of the speaker participant comprises overlaying, via the one or more processors, the animated avatar on the framing within a threshold distance of the location of the speaker participant in the framing of the video data.

5. The method of claim 1, comprising:
generating, via the one or more processors, the animated avatar based on the appearance of the speaker participant by having an appearance of the animated avatar correspond to the appearance of the speaker participant.

6. The method of claim 1, comprising:
determining, via the one or more processors, voice data of the speaker participant based on the audio data; and
associating, via the one or more processors, the animated avatar with the voice data.

7. The method of claim 6, comprising:
receiving, via the one or more processors, subsequent video data and subsequent audio data associated with subsequent respective participants in another video session;
identifying, via the one or more processors, the voice data of the speaker participant in the subsequent audio data; and
modifying, via the one or more processors, the subsequent video data to include the animated avatar associated with the voice data in response to identifying the voice data in the subsequent audio data.

8. The method of claim 1, comprising:
determining, via the one or more processors, words spoken by an additional speaker participant in the video session based on the audio data;
determining, via the one or more processors, an additional location of the additional speaker participant in the framing of the video data based on the video data and the audio data;
generating, via the one or more processors, an additional animated avatar to provide sign language representing the words spoken by the additional speaker participant;
modifying, via the one or more processors, the video data to include the animated avatar based on the location of the speaker participant and to include the additional animated avatar based on the additional location of the additional speaker participant; and
outputting, via the one or more processors, the video data that includes the animated avatar and the additional animated avatar.

9. The method of claim 8, comprising modifying, via the one or more processors, the video data to include the animated avatar adjacent to the location of the speaker participant and to include the additional animated avatar adjacent to the additional location of the additional speaker participant while avoiding overlap between the animated avatar, the additional animated avatar, the speaker participant, and the additional speaker participant.

10. The method of claim 1, comprising rendering identifier information corresponding to the speaker participant adjacent to the animated avatar.

11. A non-transitory computer readable medium comprising instructions that, when executed by one or more processors, cause the one or more processors to perform a method comprising:
receiving video data and audio data associated with respective participants in a video session;
identifying a speaker participant based on the audio data;
determining an appearance of the speaker participant based on the video data;
generating an animated avatar based on the appearance of the speaker participant;
determining a location of the speaker participant in a framing of the video data based on the video data and the audio data;
rendering the animated avatar in the video data at a position and having a first size based on the location of the speaker participant to provide sign language representing words spoken by the speaker participant;
determining the position of the animated avatar overlaps with another speaker participant and/or another animated avatar in the video data;
adjusting the animated avatar from the first size to a second size in response to determining the position of the animated avatar overlaps with another speaker participant and/or another animated avatar in the video data; and
outputting the video data that includes the animated avatar having the second size in the video data.

12. The non-transitory computer readable medium of claim 11, wherein the position is a first position, and the instructions, when executed by the one or more processors, cause the one or more processors to perform the method comprising:

determining the first position of the animated avatar overlaps with another participant and/or another animated avatar in the video data; and rendering the animated avatar in the video data to include the animated avatar at a second position in response to determining the first position of the animated avatar overlaps with another participant and/or another animated avatar in the video data.

13. The non-transitory computer readable medium of claim 12, wherein the instructions, when executed by the one or more processors, cause the one or more processors to perform the method comprising:

determining the second position is offset from another participant and/or another animated avatar on the video data; and outputting the video data that includes the animated avatar at the second position in response to determining the second position is offset from another speaker participant and/or another animated avatar in the video data.

14. The non-transitory computer readable medium of claim 11, wherein the appearance of the speaker participant is a first appearance, and the instructions, when executed by the one or more processors, cause the one or more processors to perform the method comprising:

determining adjustment of the speaker participant from the first appearance to a second appearance based on the video data;

adjusting the appearance of the animated avatar based on the adjustment of the speaker participant from the first appearance to the second appearance; and rendering the animated avatar upon adjusting the appearance of the animated avatar.

15. The non-transitory computer readable medium of claim 11, wherein the instructions, when executed by the one or more processors, cause the one or more processors to perform the method comprising:

determining an absence of words spoken by the speaker participant in a threshold duration of time after identifying the speaker participant based on the audio data; and suspending rendering of the animated avatar in the video data in response to determining the absence of words spoken by the speaker participant in the threshold duration of time.

16. The non-transitory computer readable medium of claim 11, wherein the instructions, when executed by the one or more processors, cause the one or more processors to perform the method comprising:

receiving login information from an endpoint device;

receiving the video data and the audio data from the endpoint device;

determining an avatar appearance corresponding to the login information; and generating the animated avatar based on the avatar appearance corresponding to the login information.

17. An apparatus comprising:

a memory storing instructions thereon; and one or more processors configured to execute the instructions stored on the memory to perform operations comprising:

receiving video data and audio data associated with respective participants in a video session;

identifying a speaker participant based on the audio data;

determining an appearance of the speaker participant based on the video data;

generating an animated avatar based on the appearance of the speaker participant;

determining a location of the speaker participant in a framing of the video data based on the video data and the audio data;

rendering the animated avatar in the video data at a position and having a first size based on the location of the speaker participant to provide sign language representing words spoken by the speaker participant;

determining the position of the animated avatar overlaps with another speaker participant and/or another animated avatar in the video data;

adjusting the animated avatar from the first size to a second size in response to determining the position of the animated avatar overlaps with another speaker participant and/or another animated avatar in the video data; and outputting the video data that includes the animated avatar having the second size in the video data.

18. The apparatus of claim 17, wherein the one or more processors are configured to execute the instructions stored on the memory to perform operations comprising:

adjusting the position of the animated avatar in response to determining the position of the animated avatar in the framing of the video data overlaps with another speaker participant and/or another animated avatar in the video data.

19. The apparatus of claim 17, wherein the one or more processors are configured to execute the instructions stored on the memory to perform operations comprising:

determining the appearance of the speaker participant is indeterminate; and generating an additional animated avatar having a predetermined appearance to provide sign language corresponding to the words spoken by the speaker participant in response to determining the appearance of the speaker participant is indeterminate.

20. The apparatus of claim 17, wherein the one or more processors are configured to execute the instructions stored on the memory to perform operations comprising:

outputting the video data that includes the animated avatar within a threshold distance of the speaker participant.

* * * * *